(12) United States Patent
Tomita (10) Patent No.: US 12,525,787 B2
(45) Date of Patent: Jan. 13, 2026

(54) NON-CONTACT POWER SUPPLY SYSTEM AND TRANSPORT SYSTEM

(71) Applicant: Murata Machinery, Ltd., Kyoto (JP)

(72) Inventor: Hiroyasu Tomita, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 18/726,069

(22) PCT Filed: Jul. 26, 2022

(86) PCT No.: PCT/JP2022/028797
§ 371 (c)(1),
(2) Date: Jul. 1, 2024

(87) PCT Pub. No.: WO2023/153000
PCT Pub. Date: Aug. 17, 2023

(65) Prior Publication Data
US 2025/0062607 A1 Feb. 20, 2025

(30) Foreign Application Priority Data
Feb. 14, 2022 (JP) .................... 2022-020246

(51) Int. Cl.
*H02H 7/22* (2006.01)
*B60M 1/30* (2006.01)
(Continued)

(52) U.S. Cl.
CPC ............. *H02H 7/22* (2013.01); *B60M 1/30* (2013.01); *B60M 7/00* (2013.01); *H02J 50/12* (2016.02); *H02J 50/40* (2016.02)

(58) Field of Classification Search
CPC .......... H02J 50/12; H02J 50/40; H02J 50/005; B60L 5/00; Y02T 10/72
See application file for complete search history.

(56) References Cited

U.S. PATENT DOCUMENTS 9,899,986 B2 * 2/2018 Khlat .................. H03H 7/463
2013/0009475 A1 * 1/2013 Nunoya ................ H02J 50/12
307/43

(Continued)

FOREIGN PATENT DOCUMENTS

JP 2019161756 A * 9/2019
JP 2020-108258 A 7/2020

OTHER PUBLICATIONS

Official Communication issued in corresponding European Patent Application No. 22926018.7, mailed on Dec. 4, 2025, 9 pages.

*Primary Examiner* — Rexford N Barnie
*Assistant Examiner* — Joseph N Inge
(74) *Attorney, Agent, or Firm* — Keating & Bennett, LLP (57) ABSTRACT

In a non-contact power supply system, each of a plurality of non-contact power supply devices includes a filter circuit connected to an inverter to convert power supplied from a power source into AC power and including a reactor and capacitors. The non-contact power supply system includes an electrostatic coupler to electrostatically couple one non-contact power supply device to another non-contact power supply device. The electrostatic coupler includes two capacitors electrically connected in parallel, and a different-phase coil between the filter circuit of the one non-contact power supply device and the two capacitors. The different-phase coil includes an inductance component when a short-circuit or a ground fault occurs.

5 Claims, 8 Drawing Sheets

(51) Int. Cl.
  *B60M 7/00* (2006.01)
  *H02J 50/12* (2016.01)
  *H02J 50/40* (2016.01)

(56) References Cited

U.S. PATENT DOCUMENTS

2021/0151249 A1\* 5/2021 Boys ..................... B60L 53/12
2022/0029458 A1  1/2022 Barsari et al.
2022/0072965 A1\* 3/2022 Mazaki ................. B60L 53/122
2022/0149660 A1\* 5/2022 Miyamoto ............ H02J 50/402

\* cited by examiner

NON-CONTACT POWER SUPPLY SYSTEM AND TRANSPORT SYSTEM

BACKGROUND OF THE INVENTION

1. Field of the Invention

The present invention relates to non-contact power supply systems and transport systems.

2. Description of the Related Art

As a conventional non-contact power supply system, the system described in Japanese Unexamined Patent Publication No. 2020-108258, for example, is known. The non-contact power supply system described in Japanese Unexamined Patent Publication No. 2020-108258 includes a power receiving unit configured to receive power in a non-contact manner from a power transmission device through a magnetic field, a rectifier circuit configured to rectify AC power received by the power receiving unit, a DC power line pair connected to a DC output side of the rectifier circuit, a grounding member, a pair of bypass capacitors electrically connected between the DC power line pair and the grounding member, and a zero-phase current transformer configured to detect a difference in current flowing through the power line pair. The zero-phase current transformer is disposed to detect a difference in current flowing through the DC power line pair between the rectifier circuit and the bypass capacitors. The non-contact power supply system described in Japanese Unexamined Patent Publication No. 2020-108258 detects a ground fault in the power receiving unit.

SUMMARY OF THE INVENTION

In the non-contact power supply systems, short circuits or ground faults can occur due to installation errors or component failures. If a short circuit or a ground fault occurs, a large current such as a short circuit current and a ground fault current flows, and if a large current flows to equipment such as inverters, the equipment may be damaged. Therefore, circuit breakers such as fuses and breakers are usually used to prevent a large current from flowing to the equipment. However, there are few circuit breakers that can be used for high frequency (for example, 9 kHz) currents used in non-contact power supply systems, and such circuit breakers are expensive.

Example embodiments of the present invention provide non-contact power supply systems and transport systems that each reduce or prevent a large current from flowing in a case where a short circuit or a ground fault occurs.

A non-contact power supply system according to an example embodiment of the present invention includes a plurality of non-contact power supply devices each including a filter circuit connected to an inverter to convert power supplied from a power source into AC power and including a reactor and a capacitor, an electrostatic coupler to electrostatically couple one non-contact power supply device to another non-contact power supply device and including two capacitors electrically connected in parallel, and a different-phase coil between the filter circuit of the one non-contact power supply device and the two capacitors of the electrostatic coupler and including an inductance component when a short-circuit or a ground fault occurs.

A non-contact power supply system according to an example embodiment of the present invention includes the different-phase coil between the filter circuit of the one non-contact power supply device and the two capacitors of the electrostatic coupler and including an inductance component when a short-circuit or a ground fault occurs. With this configuration, in the non-contact power supply system, even in a case where a short circuit or a ground fault occurs, since the different-phase coil includes an impedance component (impedance, resistance component), the short circuit current or the ground fault current is limited by the different-phase coil. Therefore, the non-contact power supply system can reduce or prevent a large current from flowing in a case where a short circuit or a ground fault occurs. As a result, the non-contact power supply system can reduce or prevent the inverter being damaged due to a large current, or the like.

In an example embodiment, each of the plurality of non-contact power supply devices may be configured to supply a high-frequency current, and the different-phase coil may include an inductance component of the high-frequency current. In this configuration, since the different-phase coil includes an inductance component of a high-frequency current, thereby preventing a large current from flowing in the non-contact power supply system in which the high-frequency current is used.

An example embodiment may include a plurality of feeders provided along a track rail on which a traveling vehicle travels, in which each of the plurality of non-contact power supply devices may be configured to supply power in a non-contact manner to the traveling vehicle traveling on the track rail, each of the plurality of non-contact power supply devices may include an area to provide AC power, and each of the plurality of feeders may be provided in a corresponding one of the areas to provide AC power. In this configuration, the non-contact power supply system includes the electrostatic coupler configured to electrostatically couple one non-contact power supply device to another non-contact power supply device. With this configuration, in the non-contact power supply system, for example, even when AC power cannot be supplied from the one non-contact power supply device to one feeder, the AC power can be supplied from the other non-contact power supply device to the one feeder. Thus, the non-contact power supply system allows the electrostatic coupler configured to electrostatically couple one non-contact power supply device to another non-contact power supply device to supply AC power to feeders in an area outside the area to be managed. With this configuration, the traveling vehicle can travel on the track rail.

In an example embodiment, a non-contact power supply system may include a switch to switch a coupling state and a non-coupling state of electrostatic coupling between one non-contact power supply device and another non-contact power supply device. In this configuration, the coupling state and the non-coupling state of the electrostatic coupling between one non-contact power supply device and other non-contact power supply device can be switched optionally.

A transport system according to an example embodiment of the present invention includes the above-described non-contact power supply system, and a traveling vehicle configured to travel by receiving power transmitted from the non-contact power supply system.

A transport system according to an example embodiment of the present invention includes the above-described non-contact power supply system. Therefore, the transport systems according to example embodiments of the present invention can reduce or prevent a large current from flowing in a case where a short circuit or a ground fault occurs.

With example embodiments of the present invention, a large current can be prevented from flowing in a case where a short circuit or a ground fault occurs.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments according to the present invention will now be described in detail with reference to the attached drawings. In description of the drawings, like or equivalent elements are designated by like reference signs, and duplicate description is omitted.

Figure 1:
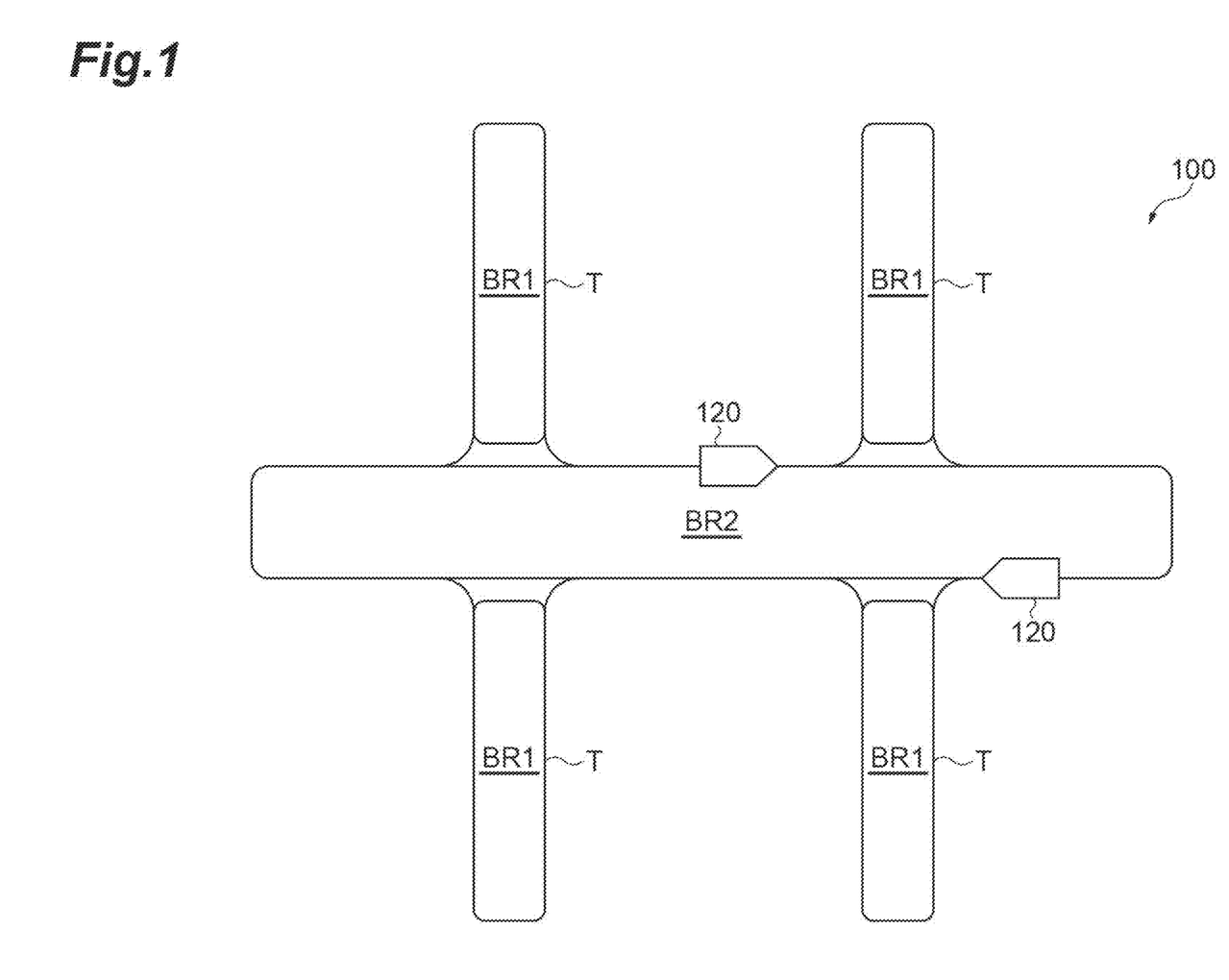
FIG. 1 is a diagram schematically illustrating a track of a transport system according to an example embodiment of the present invention.

As illustrated in FIG. 1, a transport system 100 is a system configured to convey articles using an overhead transport vehicle (traveling vehicle) 120 capable of traveling along a track rail T. The track rail T is a member on which the overhead transport vehicle 120 travels and is suspended from a ceiling. In the present example embodiment, the track rail T is divided into several (five in an example in FIG. 1) systems (bays). The track rail T includes intrabay routes (areas) BR1, each of which is a runway within a bay, and an interbay route (area) BR2, which is a runway connecting different bays. Each of the intrabay routes BR1 is set such that the overhead transport vehicle 120 goes one way in a clockwise direction. Like the intrabay route BR1, the interbay route BR2 is also set such that the overhead transport vehicle 120 goes one way in a clockwise direction.

The transport system 100 includes a non-contact power supply system 110 and the overhead transport vehicle 120. In the transport system 100, power is supplied in a non-contact manner from feeders 12A and 12B provided on the track rail T to the overhead transport vehicle 120. The overhead transport vehicle 120 travels on electric power supplied by the feeders 12A and 12B. The overhead transport vehicle 120 drives various devices provided in the overhead transport vehicle 120 with the power supplied by the feeders 12A and 12B.

The overhead transport vehicle 120 includes, for example, a ceiling suspended type crane, an overhead hoist transfer (OHT), and the like. Articles include, for example, containers configured to store a plurality of semiconductor wafers, containers configured to store glass substrates, reticle pods, general components, and the like.

Figure 2:
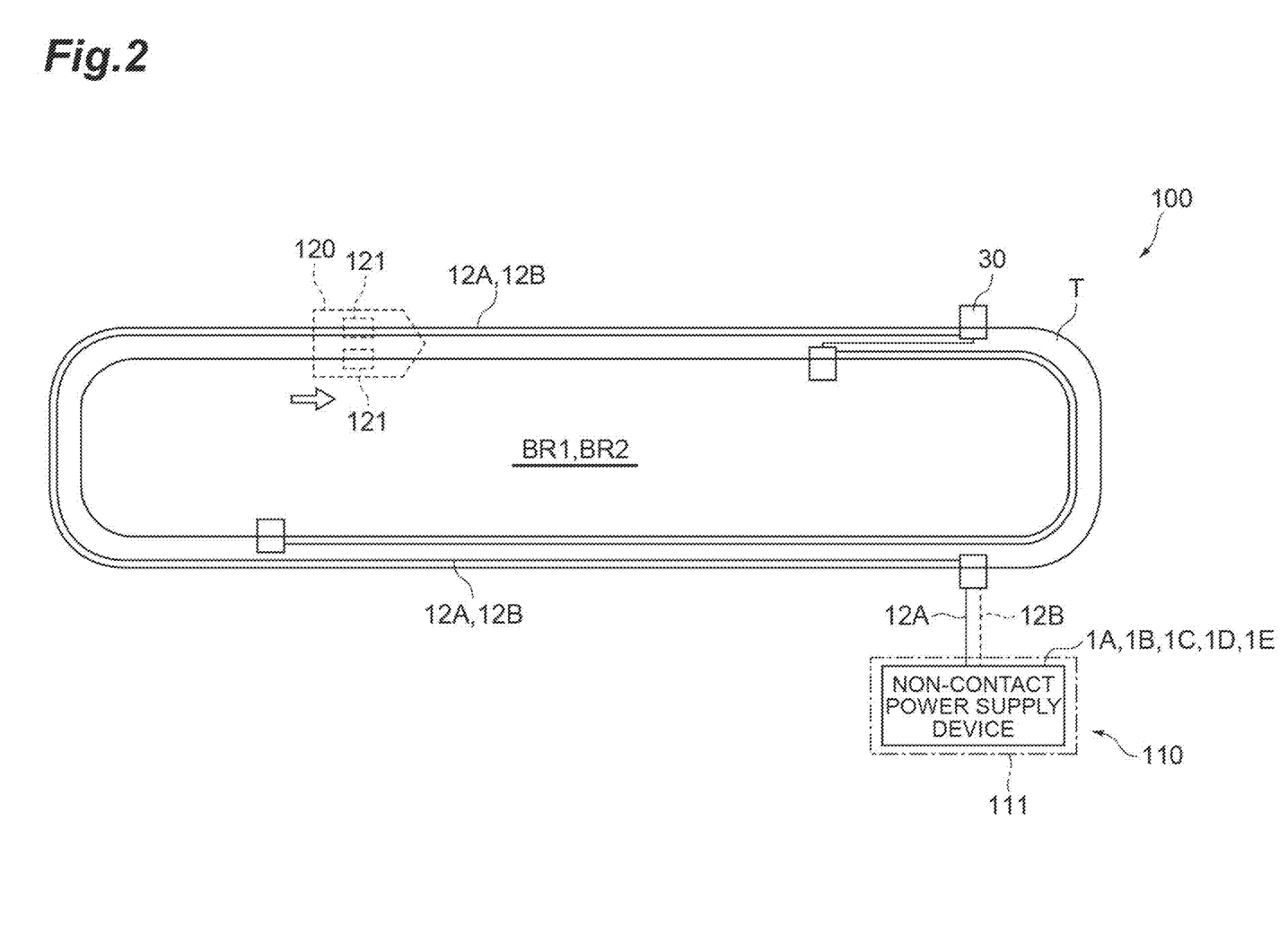
FIG. 2 is a diagram schematically illustrating a configuration of a transport system.

The track rail T is, for example, an orbital track, as illustrated in FIG. 2. The feeders 12A and 12B are supplied with power from non-contact power supply devices 1A, 1B, 1C, 1D, and 1E. The feeders 12A and 12B are disposed below the track rail T and on at least one of a right side and a left side with respect to the center of the track in a traveling direction of the overhead transport vehicle 120. Note that because the feeder 12B is provided below the feeder 12A, the feeder 12B is in a state of being laid below the feeder 12A in FIG. 2.

The feeders 12A and 12B can be rearranged with respect to the track rail T by a switching unit 30. The feeders 12A and 12B are disposed on the left side of the track rail T in an initial area connected to the non-contact power supply devices 1A, 1B, 1C, 1D, and 1E. As the overhead transport vehicle 120 travels along the track rail T in the traveling direction, the feeders 12A and 12B are switched in disposition from the left side to the right side of the track rail T by the switching unit 30.

The non-contact power supply system 110 includes the non-contact power supply devices 1A, 1B, 1C, 1D, and 1E. The non-contact power supply devices 1A, 1B, 1C, 1D, and 1E supply power in a non-contact manner to the overhead transport vehicle 120. The non-contact power supply devices 1A, 1B, 1C, 1D, and 1E supply high-frequency currents. The high-frequency is, for example, 9 kHz. The non-contact power supply devices 1A, 1B, 1C, 1D, and 1E are provided for each of the intrabay routes BR1 and the interbay route BR2. In the present example embodiment, each of the plurality of non-contact power supply devices 1A, 1B, 1C, and 1D supplies power to the corresponding intrabay route BR1. The non-contact power supply device 1E supplies power to the interbay route BR2. In the present example embodiment, the non-contact power supply devices 1A, 1B, 1C, 1D, and 1E are accommodated in a housing 111.

Figure 3:
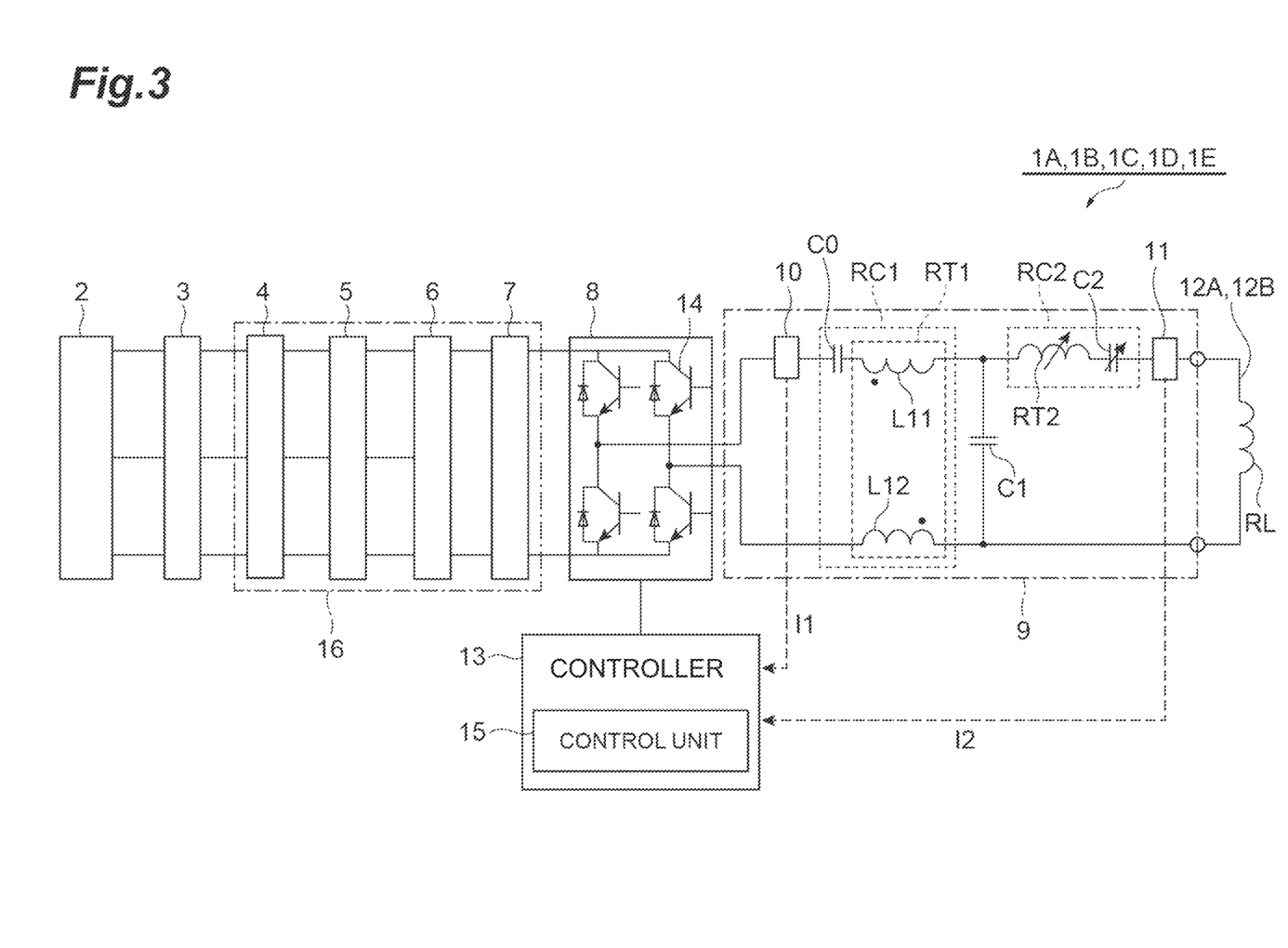
FIG. 3 is a diagram illustrating a configuration of a non-contact power supply device.

As illustrated in FIG. 3, the non-contact power supply devices 1A, 1B, 1C, 1D, and 1E include a power supply 2, a wiring breaker 3, a noise filter 4, a power factor improvement device 5, a rectifier 6, a smoother 7, an inverter 8, a filter circuit 9, a first current sensor 10, a second current sensor 11, feeders 12A and 12B, and a controller 13. The noise filter 4, the power factor improvement device 5, the rectifier 6, and the smoother 7 define a power converter 16.

The power supply 2 is a facility to supply AC power, such as a commercial power supply, and supplies AC power (for example, three-phase 200 V). A frequency of the AC power is, for example, about 50 Hz or about 60 Hz. The wiring breaker 3 opens an electrical circuit when an overcurrent flows. The noise filter 4 removes noise from the AC power. The noise filter 4 includes a capacitor, for example. The power factor improvement device 5 improves the power factor by bringing an input current closer to a sine wave. The power factor improvement device 5 includes a reactor, for example.

The rectifier 6 converts the AC power supplied from the power supply 2 (power factor improvement device 5) into DC power. The rectifier 6 includes a rectifier element, such as a diode, for example. The rectifier 6 may include a switching element such as a transistor, for example. The smoother 7 smooths the DC power converted in the rectifier 6. The smoother 7 includes an electrolytic capacitor, for example. A voltage converter may further include a step-up/step-down function.

The inverter 8 converts the DC power output from the smoother 7 into an AC power and outputs it to the filter circuit 9. The inverter 8 changes the magnitude of the AC power output to the filter circuit 9 by changing the switching frequency based on a control signal output from the controller 13. The inverter 8 may include a plurality of switching elements 14. The switching elements 14 are elements capable of switching electrical opening and closing. For example, metal oxide semiconductor field effect transistors (MOSFETs), insulated gate bipolar transistors (IGBTs), bipolar transistors, and the like may be used as the switching elements 14.

The filter circuit 9 is provided between the inverter 8 and the feeders 12A and 12B. The filter circuit 9 reduces or prevents harmonic noise. The filter circuit 9 includes a reactor RT1, a capacitor C0, a capacitor C1, a reactor RT2, and a capacitor C2.

The capacitor C0 and the reactor RT1 are connected in series to define a first resonant circuit RC1. The reactor RT1 is a different-phase coil. The reactor RT1 includes an inductance component when a short-circuit or a ground fault occurs. The inductance component of the reactor RT1 is not canceled when a short-circuit or a ground fault occurs. The reactor RT1 includes inductance component (impedance, resistance component) to a high frequency (for example, about 9 kHz or the like) current (high-frequency current).

The reactor RT1 includes a coil L11 and a coil L12. The coil L11 is provided between the inverter 8 (capacitor C0) and a second resonance circuit RC2 (described later). The coil L12 is provided between the inverter 8 and the feeders 12A and 12B. The coil L11 and the coil L12 are magnetically coupled. In the reactor RT1, inductance of each of the coils L11 and L12 is set as appropriate.

The reactor RT2 and the capacitor C2 are connected in series to define a second resonant circuit RC2. The first resonant circuit RC1 and the second resonant circuit RC2 are connected in series.

The reactor RT2 is a variable reactor capable of changing (adjusting) a reactor value thereof. The capacitor C2 is a variable capacitor capable of changing a capacitance value thereof. The reactor value (parameter) of the reactor RT2 and the capacitance value (parameter) of the capacitor C2 are set (adjusted), for example, by an operator when equipment of the transport system 100 is installed. The capacitor C1 is connected in parallel to the first resonant circuit RC1 and the second resonant circuit RC2.

The first current sensor 10 detects a current I1 (inverter current) output from the inverter 8, that is, flowing through the inverter 8. The first current sensor 10 outputs a first current signal indicating the detected current I1 to the controller 13. The second current sensor 11 detects a current I2 (feeding current) of the AC power passing through the second resonant circuit RC2. The second current sensor 11 outputs a second current signal indicating the detected current I2 to the controller 13.

The feeders 12A and 12B include coils to supply power in a non-contact manner to the power receiving unit 121 of the overhead transport vehicle 120. The feeders 12A and 12B are, for example, litz wires including a plurality of bundles of tens to hundreds of copper wires twisted together and tube covering the outer circumference of the twisted bundles, the tube being made of, for example, an insulating material. The feeders 12A and 12B generate magnetic flux when the AC power is supplied from the filter circuit 9. The feeders 12A and 12B include an inductance RL. In the present example embodiment, the phases of the alternating currents flowing through the plurality of feeders 12A and 12B are not synchronized with each other.

The controller 13 controls the operation of the inverter 8. The controller 13 may be a computer system or a processor implemented in an integrated circuit. The controller 13 includes a central processing unit (CPU), a read only memory (ROM), a random access memory (RAM), and the like, and an input/output interface and the like. The ROM stores various programs or data.

The controller 13 includes a control unit 15. The controller 13 is connected to the first current sensor 10 and the second current sensor 11 of the filter circuit 9. The controller 13 inputs the first current signal and the second current signal output from the first current sensor 10 and the second current sensor 11, respectively.

The control unit 15 controls the magnitude of the AC power supplied to the feeders 12A and 12B by controlling the inverter 8, thereby controlling the magnitude of power supplied to the overhead transport vehicle 120. In the present example embodiment, the power control is performed using phase shift control. In the phase shift control, power control parameters are changed to control the magnitude of an AC power. The control unit 15 implements phase shift control to change the magnitude (frequency) of the AC power by changing an ON period of the inverter 8. The control unit 15 uses drive signals to the plurality of switching elements 14 of the inverter 8 to adjust the switching frequency of each switching element 14, and change the ON period of each switching element 14. The power control parameter in the phase shift control is the ON period of each switching element 14 of the inverter 8.

The control unit 15 performs power control so that the value of power transmitted to the overhead transport vehicle 120 is a target value based on the first current signal and the second current signal output from the first current sensor 10 and the second current sensor 11, respectively.

Figure 4:
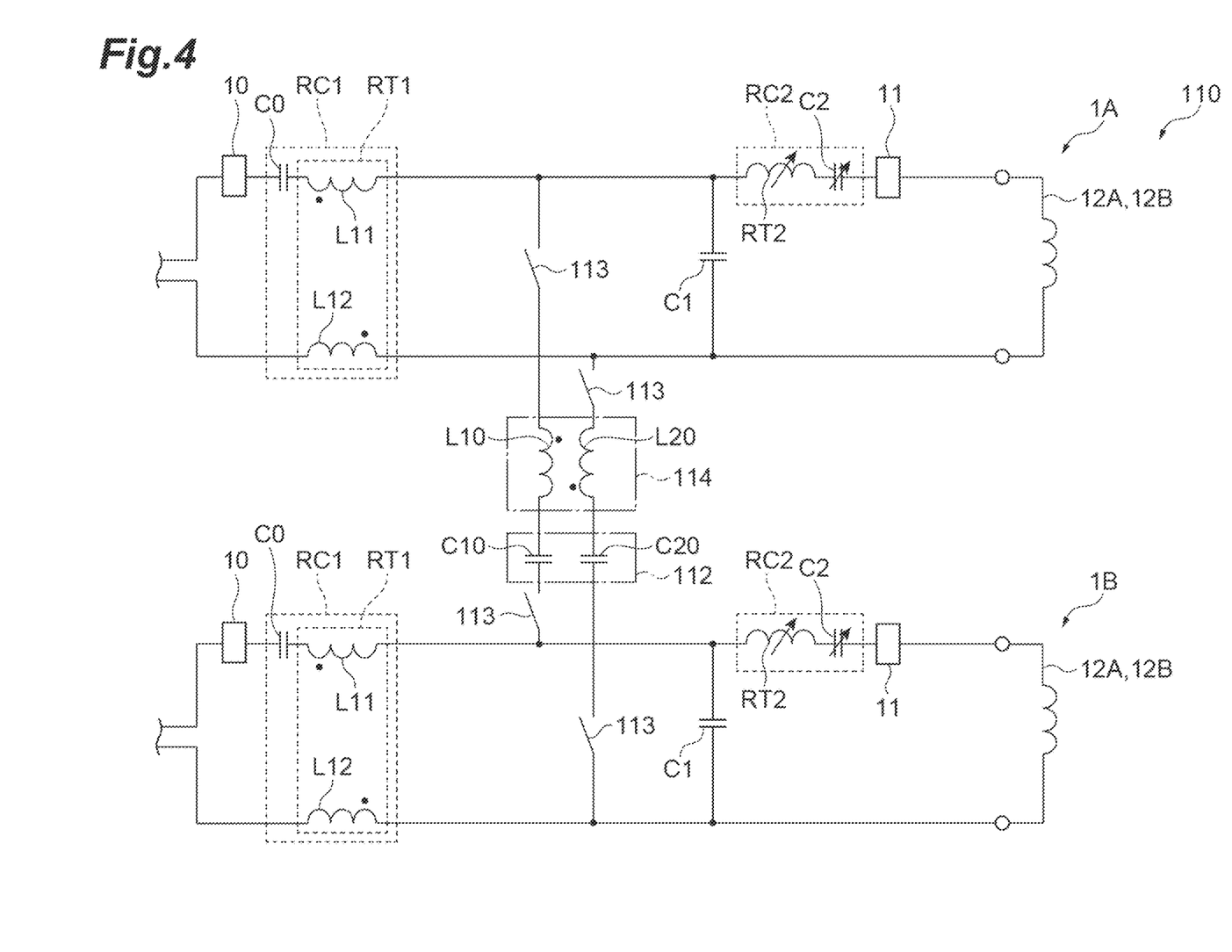
FIG. 4 is a diagram illustrating a configuration of a non-contact power supply system.

In the non-contact power supply system 110, the non-contact power supply devices 1A, 1B, 1C, 1D, and 1E are electrostatically coupled to each other. FIG. 4 illustrates one example of a configuration in which the non-contact power supply device 1A and the non-contact power supply device 1B are electrostatically coupled to each other. As illustrated in FIG. 2 or FIG. 4, the non-contact power supply system 110 further includes a housing 111, an electrostatic coupler 112, a switch (switching unit) 113, and a different-phase coil 114.

The housing 111 accommodates non-contact power supply devices 1A, 1B, 1C, 1D, and 1E. The housing 111 is installed in a predetermined place at a plant.

The electrostatic coupler 112 electrostatically couples the non-contact power supply device 1A to the non-contact power supply device 1B. The electrostatic coupler 112 is connected to output ends of the non-contact power supply devices 1A and 1B (ends connected to the feeders 12A and 12B). The electrostatic coupler 112 includes a capacitor C10 and a capacitor C20. In other words, the non-contact power supply device 1A and the non-contact power supply device 1B are electrostatically coupled by the capacitors C10 and C20. The capacitor C10 and the capacitor C20 are electrically connected in parallel. The electrostatic coupler 112 is provided in the housing 111. In other words, the non-contact power supply devices 1A, 1B, 1C, 1D, and 1E are electrostatically coupled to each other in the housing 111. In the present example embodiment, all the non-contact power supply devices 1A, 1B, 1C, 1D, and 1E are electrostatically coupled by the electrostatic coupler 112.

The electrostatic coupler 112 supplies alternating current from the non-contact power supply device 1A to the feeders 12A and 12B of the non-contact power supply device 1B, or from the non-contact power supply device 1B to the feeders 12A and 12B of the non-contact power supply device 1A. In the electrostatic coupler 112, a capacitance of each of the capacitors C10 and C20 is set as appropriate. In the present example embodiment, the impedance of the electrostatic coupler 112 is set equivalent to the impedance of the second resonant circuit RC2 (feeders 12A and 12B) as viewed from a side of the overhead transport vehicle 120 (power receiving side) to which the power is supplied. In other words, the impedance of the electrostatic coupler 112 resonates with the impedance of the feeders 12A and 12B.

A switch 113 switches the coupling state and the non-coupling state of the electrostatic coupling between one non-contact power supply device and other non-contact power supply device. In other words, in an example illustrated in FIG. 4, the switch 113 switches ON/OFF of the supply of alternating current from the non-contact power supply device 1A to the feeders 12A and 12B of the non-contact power supply device 1B, or from the non-contact power supply device 1B to the feeders 12A and 12B of the non-contact power supply device 1A. The switch 113 is, for example, a breaker, a magnetic conductor, a semiconductor device such as an IGBT, or the like.

In the non-contact power supply system 110, when the AC power supplied from one non-contact power supply device to one feeders 12A and 12B decreases (voltage drops), the AC power is supplied to the one feeders 12A and 12B from the other non-contact power supply device. In the non-contact power supply system 110, when the switch 113 is turned OFF, the supply of AC power from the non-contact power supply devices 1A, 1B, 1C, 1D, and 1E to the feeders 12A and 12B in the other system is stopped.

The different-phase coil 114 includes an inductance component when a short-circuit or a ground fault occurs. The inductance component of the different-phase coil 114 is not canceled when a short-circuit or a ground fault occurs. The different-phase coil 114 includes an inductance component (impedance, resistance component) to a high frequency (for example, about 9 kHz or the like) current (high-frequency current). The different-phase coil 114 is provided between the filter circuit 9 of the one non-contact power supply device and the electrostatic coupler 112. In other words, the different-phase coil 114 is provided between the filter circuit 9 of the one non-contact power supply device and the two capacitors (capacitor C10 and capacitor C20). In the example illustrated in FIG. 4, the different-phase coil 114 is provided between the filter circuit 9 of the non-contact power supply device 1A and the capacitors C10 and C20.

The different-phase coil 114 includes a coil L10 and a coil L20. The coil L10 is provided between the non-contact power supply device 1A and the capacitor C10 of the electrostatic coupler 112. The coil L20 is provided between the non-contact power supply device 1A and the capacitor C20. The coil L10 and the coil L20 are magnetically coupled. In the different-phase coil 114, inductance of each of the coils L10 and L20 is set as appropriate.

Figure 5:
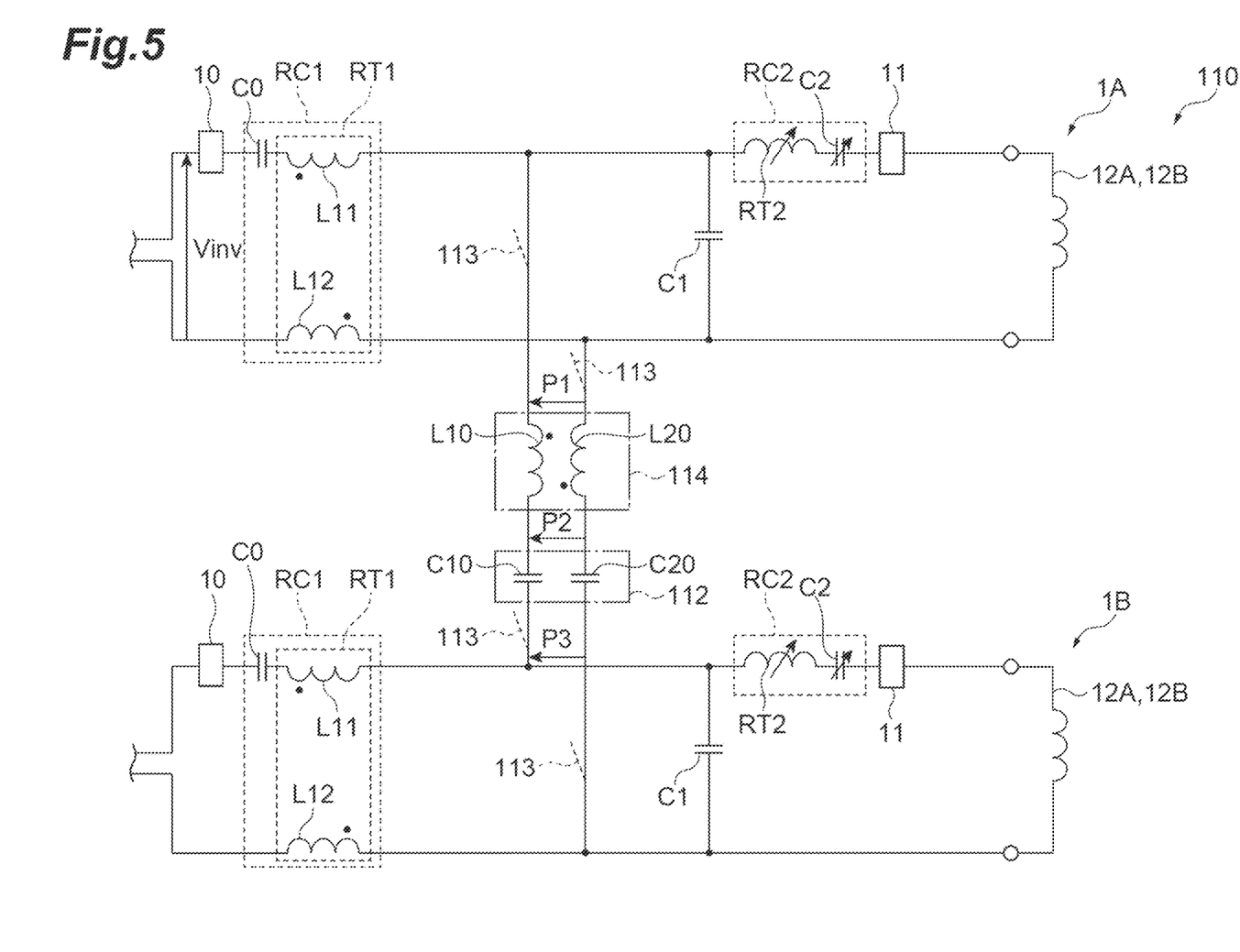
FIG. 5 is a diagram illustrating a short-circuit point in a case where a short circuit occurs.

FIG. 5 is a diagram illustrating a short-circuit point in a case where a short circuit occurs. FIG. 5 illustrates a state in which a short circuit occurs at each of a short-circuit point P1, a short-circuit point P2, and a short-circuit point P3. As illustrated in FIG. 5, in a case where a short circuit occurs at the short-circuit point P1, when the short-circuit current is $I_{short1}$, the voltage of inverter 8 is $V_{inv}$, and the inductance of each of the coil L11 and the coil L12 of the reactor RT1 is L1, the short circuit current $I_{short1}$ is as follows.

$$I_{short1} = \frac{V_{inv}}{j\omega L1 \times 2}$$ Equation 1

As described above, since the reactor RT1 is provided in the first resonant circuit RC1 of the filter circuit 9, the short-circuit current $I_{short1}$ is limited, and a large short-circuit current $I_{short1}$ is difficult to flow to the inverter 8.

In a case where a short-circuit occurs at the short-circuit point P2, when the short-circuit current is $I_{short2}$, the voltage of the inverter 8 is $V_{inv}$, the inductance of each of the coil L11 and the coil L12 of the reactor RT1 is L1, and the inductance of each of the coil L10 and the coil L20 of the different-phase coil 114 is L2, the short-circuit current $I_{short2}$ is as described below.

$$I_{short2} = \frac{V_{inv}}{j\omega L1 \times 2 + j\omega L2 \times 2}$$ Equation 2

As described above, since the reactor RT1 of the first resonant circuit RC1 of the filter circuit 9 and the different-phase coil 114 are provided, the short-circuit current $I_{short2}$ is limited, and a large short-circuit current $I_{short2}$ is difficult to flow to the inverter 8.

In a case where a short-circuit occurs at the short-circuit point P3, when the short-circuit current is $I_{short3}$, the voltage of the inverter 8 is $V_{inv}$, the inductance of each of the coil L11 and the coil L12 of the reactor RT1 is L1, the inductance of each of the coil L10 and the coil L20 of the different-phase coil 114 is L2, and the capacitance of each of the capacitors C10 and C20 in the electrostatic coupler 112 is C, the short-circuit current $I_{short3}$ is as described below.

$$I_{short3} = \frac{V_{inv}}{j\omega L1 \times 2 + j\omega L2 \times 2 - \frac{1}{j\omega C/2}}$$ Equation 3

In the above-described short-circuit current $I_{short3}$, when $j\omega L1\times 2=1/(j\omega C/2)$ by design, the denominator is not zero because the inductance L2 remains. Therefore, the short-circuit current $I_{short3}$ is limited and a large short-circuit current $I_{short3}$ is difficult to flow to the inverter 8. On the other hand, in a configuration without coils L10 and L20 of the different-phase coil 114, since there is no denominator $j\omega L2\times 2$ in the short circuit current $I_{short3}$, the short-circuit current $I_{short3}$ is larger in a case of $j\omega L1\times 2=1/(j\omega C/2)$.

Figure 6:
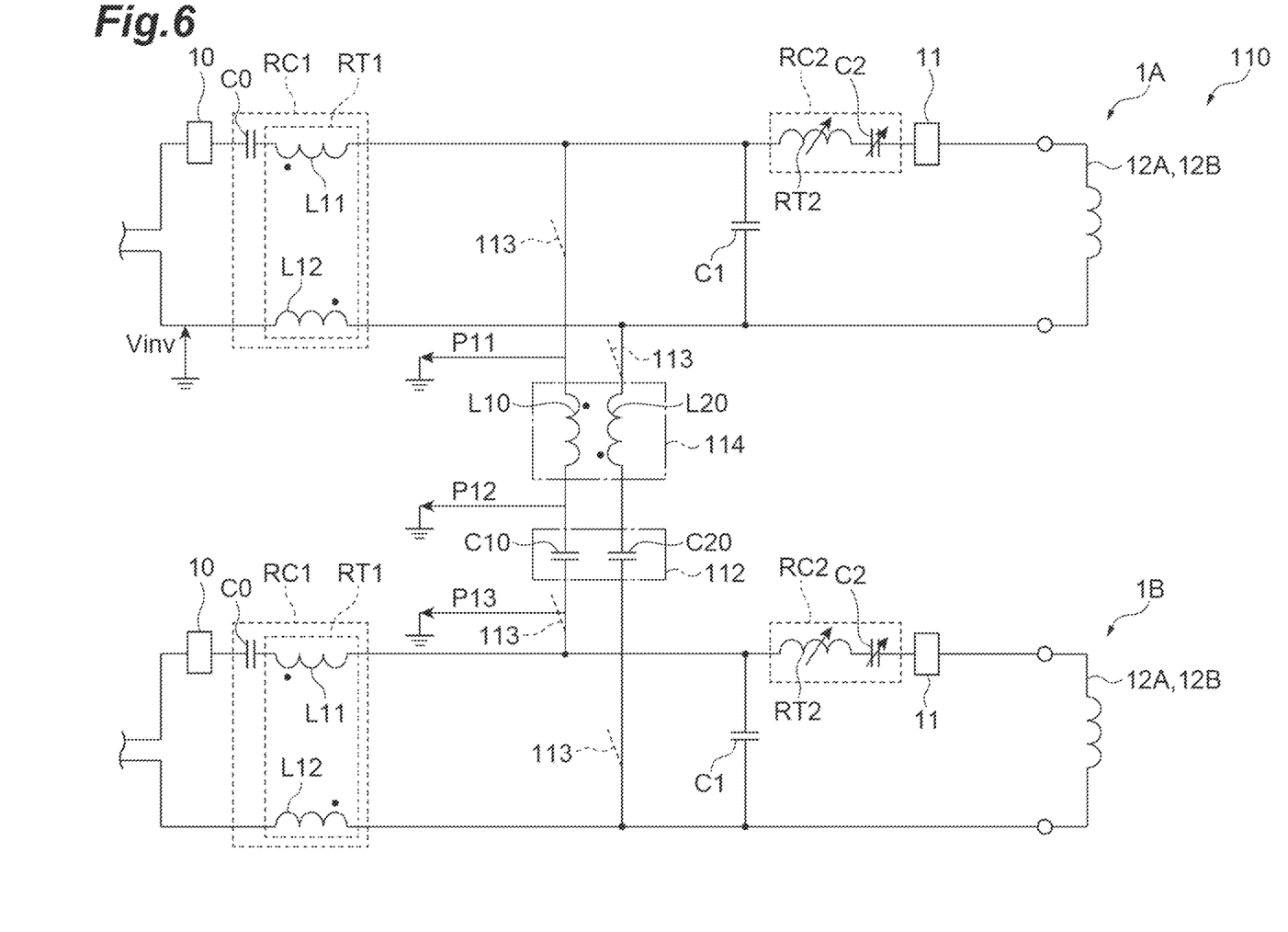
FIG. 6 is a diagram illustrating a ground fault point in a case where a ground fault occurs.

FIG. 6 is a diagram illustrating a ground fault point in a case where a ground fault occurs. FIG. 6 illustrates a state in which a ground fault occurs at each of the ground fault point P11, the ground fault point P12, and the ground fault point P13. As illustrated in FIG. 6, in a case where a short circuit occurs at the ground fault point P11, when the ground fault current is $I_{short11}$, the voltage of the inverter 8 is $V_{inv}$, and the inductance of the coil L12 of the reactor RT1 is L1, the ground fault current $I_{short11}$ is as described below.

$$I_{short11} = \frac{V_{inv}}{j\omega L1}$$ Equation 4

As described above, since the reactor RT1 is provided in the first resonant circuit RC1 of the filter circuit 9, the ground fault current $I_{short11}$ is limited and a large ground fault current $I_{short11}$ is difficult to flow to the inverter 8.

In a case where a short circuit occurs at the ground fault point P12, when the ground fault current is $I_{short12}$, the voltage of the inverter 8 is $V_{inv}$, the inductance of coil L12 of reactor RT1 is L1, and the inductance of coil L10 of different-phase coil 114 is L2, the ground fault current $I_{short12}$ is as described below.

$$I_{short12} = \frac{V_{inv}}{j\omega L1 + j\omega L2} \quad \text{Equation 5}$$

As described above, since the reactor RT1 of the first resonant circuit RC1 of the filter circuit 9 and the different-phase coil 114 are provided, the ground fault current $I_{short12}$ is limited and a large earth fault current $I_{short12}$ is difficult to flow to the inverter 8.

In a case where a short circuit occurs at the ground fault point P13, when the ground fault current is $I_{short13}$, the voltage of the inverter 8 is $V_{inv}$, the inductance of the coil L12 of the reactor RT1 is L1, the inductance of coil L10 of different-phase coil 114 is L2, the capacitance of each of the capacitor C10 is C, and the capacitor C20 of the electrostatic coupler 112, the ground fault current $I_{short13}$ is as described below.

$$I_{short13} = \frac{V_{inv}}{j\omega L1 + j\omega L2 - \frac{1}{j\omega C}} \quad \text{Equation 6}$$

In the above-described ground fault current $I_{short13}$, in a case of $j\omega L1 = 1/j\omega C$ by design, the denominator is not zero because the inductance L2 remains. Therefore, the short-circuit current $I_{short13}$ is limited and a large short-circuit current $I_{short13}$ is difficult to flow to the inverter 8. On the other hand, in the configuration without coils L10 and L20 of the different-phase coil 114, since there is no denominator $j\omega L2$ in the short circuit $I_{short13}$, the short-circuit current $I_{short13}$ is larger in a case of $j\omega L1 = 1/j\omega C$.

As illustrated in FIGS. 1 and 2, the overhead transport vehicle 120 travels along the track rail T to convey articles. The overhead transport vehicle 120 is configured to be capable of transferring articles. The number of units of the overhead transport vehicle 120 included in the transport system 100 is not limited to a particular number, and is two or more.

Figure 7:
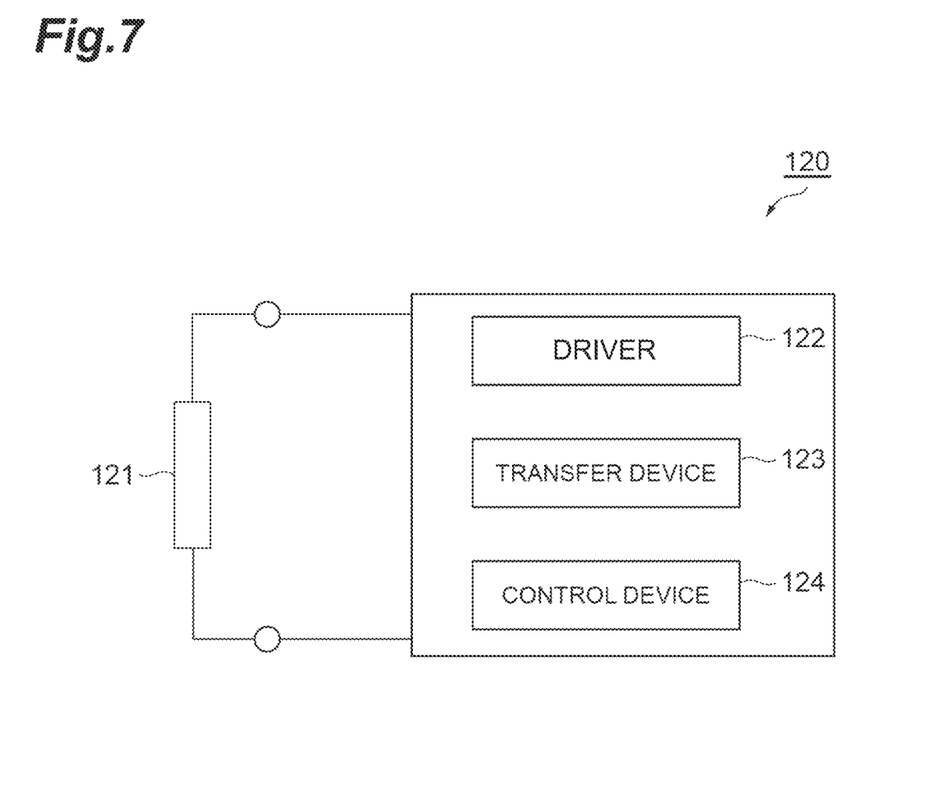
FIG. 7 is a diagram illustrating an overhead transport vehicle.

As illustrated in FIG. 7, the overhead transport vehicle 120 includes a power receiving unit 121, a driver 122, a transfer device 123, and a controller 124.

The power receiving unit 121 receives power transmitted from the non-contact power supply devices 1A, 1B, 1C, 1D, and 1E in a non-contact manner. The power receiving unit 121 is a coil configured to receive power. Interlinkage of the magnetic flux generated by the feeders 12A and 12B with the power receiving unit 121 generates an AC power in the power receiving unit 121. The power receiving unit 121 supplies the AC power to the driver 122 and the transfer device 123. A capacitor and a reactor may be connected between the power receiving unit 121 and the driver 122, and between the power receiving unit 121 and the transfer device 123.

The driver 122 rotates and drives a plurality of wheels (not illustrated). The driver 122 uses, for example, an electric motor or a linear motor, or the like, and uses power supplied from the power receiving unit 121 as power for driving.

The transfer device 123 is capable of holding and accommodating articles to be transferred, and transfers the articles. The transfer device 123 includes, for example, a side-unloading mechanism that holds and protrudes articles, an elevating mechanism that moves the articles downward, and the like. By driving the side-unloading mechanism and the elevating mechanism, the transfer device 123 delivers and receives the articles to and from a load port of a storage device such as a stocker or the like that is a transfer destination or a load port of a processing device. The transfer device 123 uses power supplied from the power receiving unit 121 as power for driving.

The controller 124 controls the driver 122 and the transfer device 123. The controller 124 uses the power supplied from the power receiving unit 121 as the power for driving.

As described above, the transport system 100 according to the present example embodiment includes the non-contact power supply system 110. The non-contact power supply system 110 according to the present example embodiment includes the different-phase coil 114 that is provided between the filter circuit 9 of the one non-contact power supply device and the two capacitors C10 and C20 of the electrostatic coupler 112, the different-phase coil 114 including an inductance component when a short-circuit or a ground fault occurs. With this configuration, in the non-contact power supply system 110, even in a case where a short circuit or a ground fault occurs, since the different-phase coil 114 has an inductance component (impedance, resistance component), the short circuit current or the ground fault current is limited by the different-phase coil 114. Therefore, the non-contact power supply system 110 can prevent a large current from flowing in a case where a short circuit or a ground fault occurs. As a result, the non-contact power supply system 110 can prevent the inverter 8 (switching element 14) from being damaged due to the large current.

In the non-contact power supply system 110 according to the present example embodiment, each of a plurality of the non-contact power supply devices 1A, 1B, 1C, 1D, and 1E is a device configured to supply high-frequency currents to the feeders 12A and 12B. The different-phase coil 114 includes an inductance component of a high-frequency current. In this configuration, since the different-phase coil includes an inductance component of a high-frequency current, thus preventing a large current from flowing in the non-contact power supply system in which the high-frequency current is used.

The non-contact power supply system 110 according to the present example embodiment includes the feeders 12A and 12B, which are provided along the track rail T on which the overhead transport vehicle 120 travels. Each of the plurality of non-contact power supply devices 1A, 1B, 1C, 1D, and 1E supplies power in a non-contact manner to the overhead transport vehicle 120 traveling on the track rail T. Each of the plurality of non-contact power supply devices 1A, 1B, 1C, 1D, and 1E has an area set to supply AC power, and each of the plurality of feeders 12A and 12B is provided in the corresponding area. In this configuration, the non-contact power supply system 110 includes the electrostatic coupler 112 configured to electrostatically couple one non-contact power supply device to another non-contact power supply device. With this configuration, in the non-contact power supply system 110, even when AC power cannot be supplied from the non-contact power supply device 1A to one feeders 12A and 12B, for example, the AC power can be supplied from the non-contact power supply device 1B to the one feeders 12A and 12B. Thus, the non-contact power supply system 110 allows the electrostatic coupler 112 configured to electrostatically couple one non-contact power supply device to another non-contact power supply device to supply AC power to feeders 12A and 12B in an area outside the area to be managed. With this configuration, the overhead transport vehicle 120 can travel on the track rail T.

The non-contact power supply system 110 according to the present example embodiment includes the switch 113 configured to switch a coupling state and a non-coupling state of electrostatic coupling between one non-contact power supply device and another non-contact power supply device. In this configuration, the coupling state and the non-coupling state of the electrostatic coupling between one non-contact power supply device and other non-contact power supply device can be switched optionally. Consequently, for example, when performing maintenance on one intrabay route BR1, the switch 113 connected to the non-contact power supply device of the one intrabay route BR1 can be turned off to prevent power from being supplied to the overhead transport vehicle 120 in the one intrabay route BR1.

Although some example embodiments according to the present invention have been described above, the present invention is not limited to the above-described example embodiments, and various modifications can be made within the scope not departing from the gist of the present invention.

In the above-described example embodiments, a structural configuration in which the different-phase coil 114 is provided between the non-contact power supply devices 1A and the electrostatic coupler 112 is described as an example. However, the different-phase coil 114 need only be provided between the electrostatic coupler 112 and any of the plurality of non-contact power supply devices 1A, 1B, 1C, 1D, and 1E.

Figure 8:
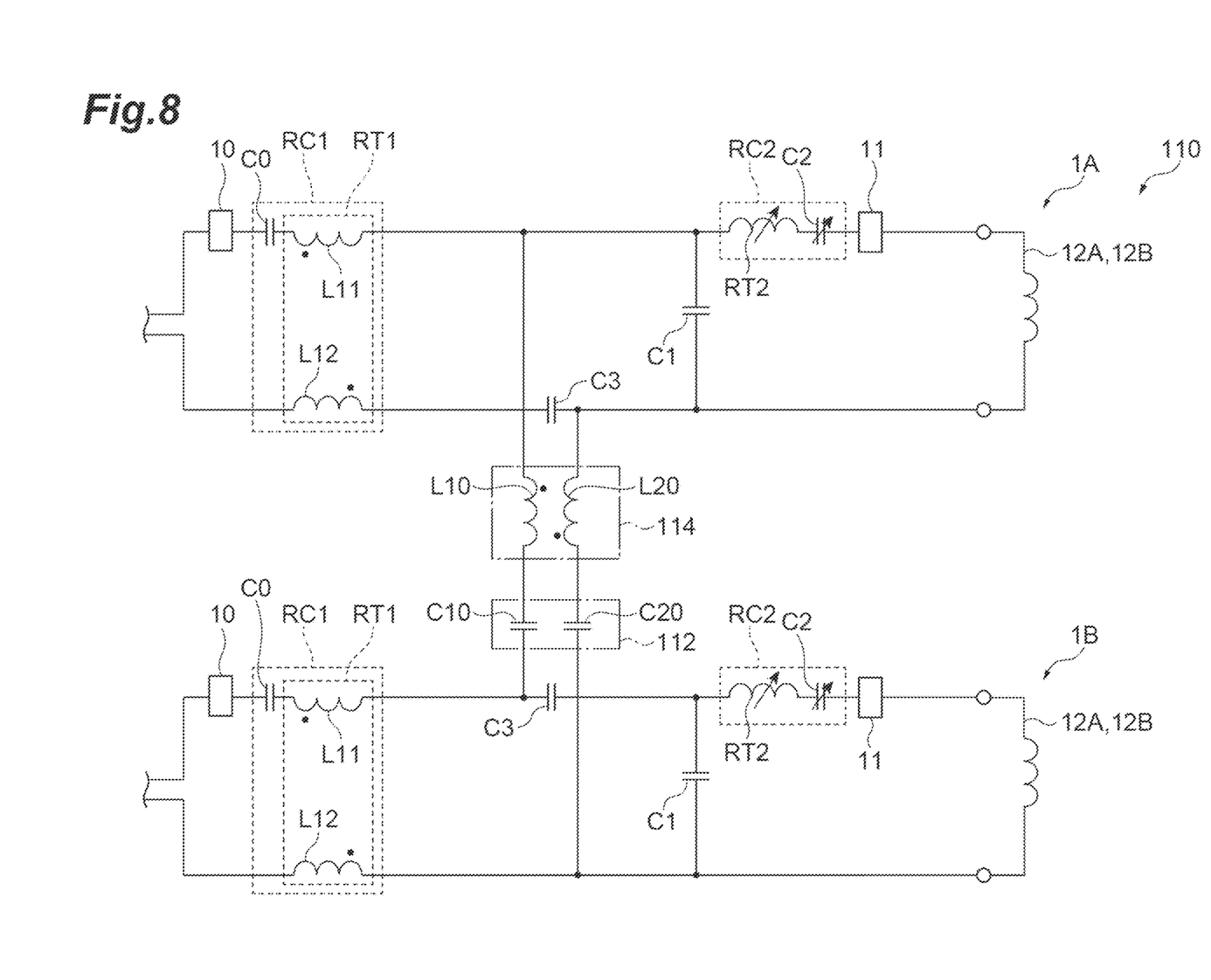
FIG. 8 is a diagram illustrating a configuration of a non-contact power supply system according to another example embodiment of the present invention.

In the above-described example embodiments, a structural configuration in which the non-contact power supply system 110 includes the switch 113 is described as an example. However, as illustrated in FIG. 8, the non-contact power supply system 110A does not need to include the switch 113. In this configuration, the non-contact power supply devices 1A and 1B include capacitors C3.

In the above-described example embodiment, a structural configuration in which all the non-contact power supply devices 1A, 1B, 1C, 1D, and 1E are electrostatically coupled by the electrostatic coupler 112 is described as an example. However, in the non-contact power supply system 110, at least two non-contact power supply devices of the plurality of non-contact power supply devices 1A, 1B, 1C, 1D, and 1E need only be electrostatically coupled by the electrostatic coupler 112.

In the above-described example embodiment, a structural configuration in which the track rail T includes the intrabay routes BR1 and the interbay route BR2 is described as an example However, the track rail T may be a single orbital track. In this configuration, a single track rail T may be divided into a plurality of areas, and the non-contact power supply devices 1A, 1B, 1C, 1D, and 1E may supply AC power to each area.

In the above-described example embodiment, a structural configuration in which the traveling vehicle is the overhead transport vehicle 120 is described as an example. However, a moving body is not limited to an overhead transport vehicle, but can be any traveling vehicle traveling on the track rail T. For example, the traveling vehicle may be a floor transport vehicle (floor traveling vehicle). If the traveling vehicle is a floor transport vehicle, track rails are laid on a floor.

Example embodiments of the present invention may be as described below.

[1] A non-contact power supply system including a plurality of non-contact power supply devices each including a filter circuit connected to an inverter to convert power supplied from a power source into AC power and including a reactor and a capacitor, an electrostatic coupler to electrostatically couple one non-contact power supply device to another non-contact power supply device and including two capacitors electrically connected in parallel, and a different-phase coil between the filter circuit of the one non-contact power supply device and the two capacitors of the electrostatic coupler and including an inductance component when a short-circuit or a ground fault occurs.

[2] The non-contact power supply system according to [1], in which each of the plurality of non-contact power supply devices is configured to supply a high-frequency current, and the different-phase coil includes an inductance component of the high-frequency current.

[3] A non-contact power supply system according to [1] or [2], including a plurality of feeders provided along a track rail on which a traveling vehicle travels, in which each of the plurality of non-contact power supply devices is configured to supply power in a non-contact manner to the traveling vehicle traveling on the track rail, each of the plurality of non-contact power supply devices includes an area to provide AC power, and each of the plurality of feeders is provided in a corresponding one of the areas to provide AC power.

[4] The non-contact power supply system according to any one of [1] to [3], further including a switch to switch a coupling state and a non-coupling state of electrostatic coupling between the one non-contact power supply device and the other non-contact power supply device.

[5] A transport system including the non-contact power supply system according to any one of [1] to [4], and a traveling vehicle to travel by receiving power transmitted from the non-contact power supply system.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A non-contact power supply system comprising:
    a plurality of non-contact power supply devices each including a filter circuit connected to an inverter to convert power supplied from a power source into AC power and including a reactor and a capacitor;
    an electrostatic coupler to electrostatically couple one non-contact power supply device to another non-contact power supply device and including two capacitors electrically connected in parallel; and
    a different-phase coil between the filter circuit of the one non-contact power supply device and the two capacitors of the electrostatic coupler and including an inductance component when a short-circuit or a ground fault occurs.

2. The non-contact power supply system according to claim 1, wherein each of the plurality of non-contact power supply devices is configured to supply a high-frequency current; and the different-phase coil includes an inductance component of the high-frequency current.

3. The non-contact power supply system according to claim 1, further comprising a plurality of feeders provided along a track rail on which a traveling vehicle travels; wherein
- each of the plurality of non-contact power supply devices is configured to supply power in a non-contact manner to the traveling vehicle traveling on the track rail;
- each of the plurality of non-contact power supply devices includes an area to provide AC power; and
- each of the plurality of feeders is provided in a corresponding one of the areas to provide AC power.

4. The non-contact power supply system according to claim 1, further comprising a switch to switch a coupling state and a non-coupling state of electrostatic coupling between the one non-contact power supply device and the other non-contact power supply device.

5. A transport system comprising:
- the non-contact power supply system according to claim 1; and
- a traveling vehicle to travel by receiving the power transmitted from the non-contact power supply system.

* * * * *